United States Patent [19]  [11] Patent Number: 4,881,931
Buchman  [45] Date of Patent: Nov. 21, 1989

[54] HEM SEAL FOR DRAW TAPE BAGS
[75] Inventor: James E. Buchman, Appleton, Wis.
[73] Assignee: Presto Products, Incorporated, Appleton, Wis.
[21] Appl. No.: 36,896
[22] Filed: Apr. 10, 1987
[51] Int. Cl.4 .............................................. B31B 1/64
[52] U.S. Cl. ................................... 493/192; 493/197; 493/205; 493/208; 493/928; 156/583.1
[58] Field of Search ............... 493/191, 192, 197, 202, 493/205, 208, 225, 928; 156/497, 582, 583.1

[56] References Cited
U.S. PATENT DOCUMENTS

| | | |
|---|---|---|
| 544,197 | 8/1895 | Staples . |
| 1,125,666 | 1/1915 | Dalton . |
| 1,671,050 | 5/1928 | Snyder . |
| 1,818,030 | 8/1931 | Arnold . |
| 1,861,864 | 6/1932 | Kennedy . |
| 1,920,823 | 8/1933 | West et al. . |
| 1,920,824 | 8/1933 | West . |
| 2,029,853 | 4/1962 | Piazze . |
| 2,334,256 | 11/1943 | Eaton . |
| 2,565,283 | 8/1951 | Throckmorton . |
| 2,656,769 | 10/1953 | Holtkrans . |
| 2,777,491 | 1/1957 | Ashton et al. . |
| 2,798,523 | 7/1957 | Barrett . |
| 2,799,611 | 7/1957 | Dreisbach . |
| 2,897,729 | 8/1959 | Ashton et al. . |
| 2,900,934 | 8/1959 | Judelson . |
| 2,993,455 | 7/1961 | Baize . |
| 3,010,640 | 11/1961 | Kugler . |
| 3,013,597 | 12/1961 | Moran . |
| 3,046,847 | 7/1962 | Voege et al. . |
| 3,058,402 | 10/1962 | Kugler . |
| 3,058,403 | 10/1962 | Kugler . |
| 3,061,169 | 10/1962 | Yermakoff et al. . |
| 3,079,844 | 3/1963 | Kugler . |
| 3,084,731 | 4/1963 | Kugler . |
| 3,093,295 | 6/1963 | Kugler . |
| 3,094,269 | 6/1963 | Schneider . |
| 3,119,549 | 1/1964 | Schoen . |
| 3,196,757 | 7/1965 | Samways . |
| 3,210,227 | 10/1965 | Shichman ........................... 156/497 |
| 3,228,584 | 1/1966 | Ashton . |
| 3,283,672 | 11/1966 | Mueller . |
| 3,406,610 | 10/1968 | Golden . |
| 3,413,178 | 11/1968 | Langevin ........................ 156/583.1 |
| 3,414,032 | 12/1968 | Jortikka . |
| 3,460,741 | 8/1969 | Kugler . |
| 3,506,048 | 4/1970 | Jortikka . |
| 3,512,223 | 5/1970 | Willinger . |
| 3,512,456 | 5/1970 | Meyer . |
| 3,547,341 | 2/1970 | Kirkpatrick . |
| 3,568,576 | 3/1971 | Lehmacher . |
| 3,687,357 | 8/1972 | Hansen . |
| 3,721,383 | 3/1973 | Dutes . |
| 3,738,567 | 6/1973 | Ruda . |
| 3,738,568 | 6/1973 | Ruda . |
| 3,772,968 | 11/1973 | Ruda . |
| 3,803,490 | 4/1974 | Pedersen . |
| 4,268,345 | 5/1981 | Semchock ........................ 156/583.1 |
| 4,308,087 | 12/1981 | Johnson . |
| 4,318,768 | 3/1982 | Johnson . |
| 4,493,683 | 1/1985 | Jostler . |
| 4,498,939 | 2/1985 | Johnson . |
| 4,547,237 | 10/1985 | Hendrickson . |
| 4,558,463 | 12/1985 | Boyd . |
| 4,597,750 | 7/1986 | Boyd et al. . |
| 4,628,536 | 12/1986 | Herrington . |
| 4,650,451 | 3/1987 | Herrington . |
| 4,654,180 | 3/1987 | Herrington . |
| 4,664,649 | 5/1987 | Johnson et al. ..................... 493/225 |
| 4,714,454 | 12/1987 | Herrington ........................ 493/225 |
| 4,717,372 | 1/1988 | Herrington ........................ 493/225 |
| 4,721,502 | 1/1988 | Herrington ........................ 493/208 |

FOREIGN PATENT DOCUMENTS

| | | |
|---|---|---|
| 475548 | 7/1951 | Canada . |
| 92001 | 1/1962 | Denmark . |
| 1084473 | 6/1960 | Fed. Rep. of Germany . |
| 93701 | 10/1959 | Netherlands . |
| 189062 | 4/1964 | Sweden . |
| 1125363 | 8/1968 | United Kingdom . |

Primary Examiner—Frederick R. Schmidt
Assistant Examiner—Robert Showalter
Attorney, Agent, or Firm—Willian Brinks Olds Hofer Gilson & Lione

[57] ABSTRACT

Apparatus and methods for manufacturing draw tape bags from a web of plastic material are disclosed. The apparatus and methods relate to draw tape bags in which a hem seal, enclosing the draw tape, is formed in the bag without stopping the movement of the web through the hem sealing station.

7 Claims, 3 Drawing Sheets

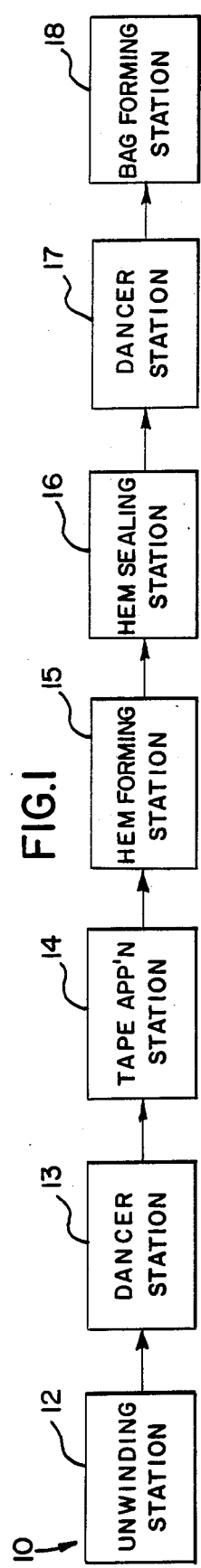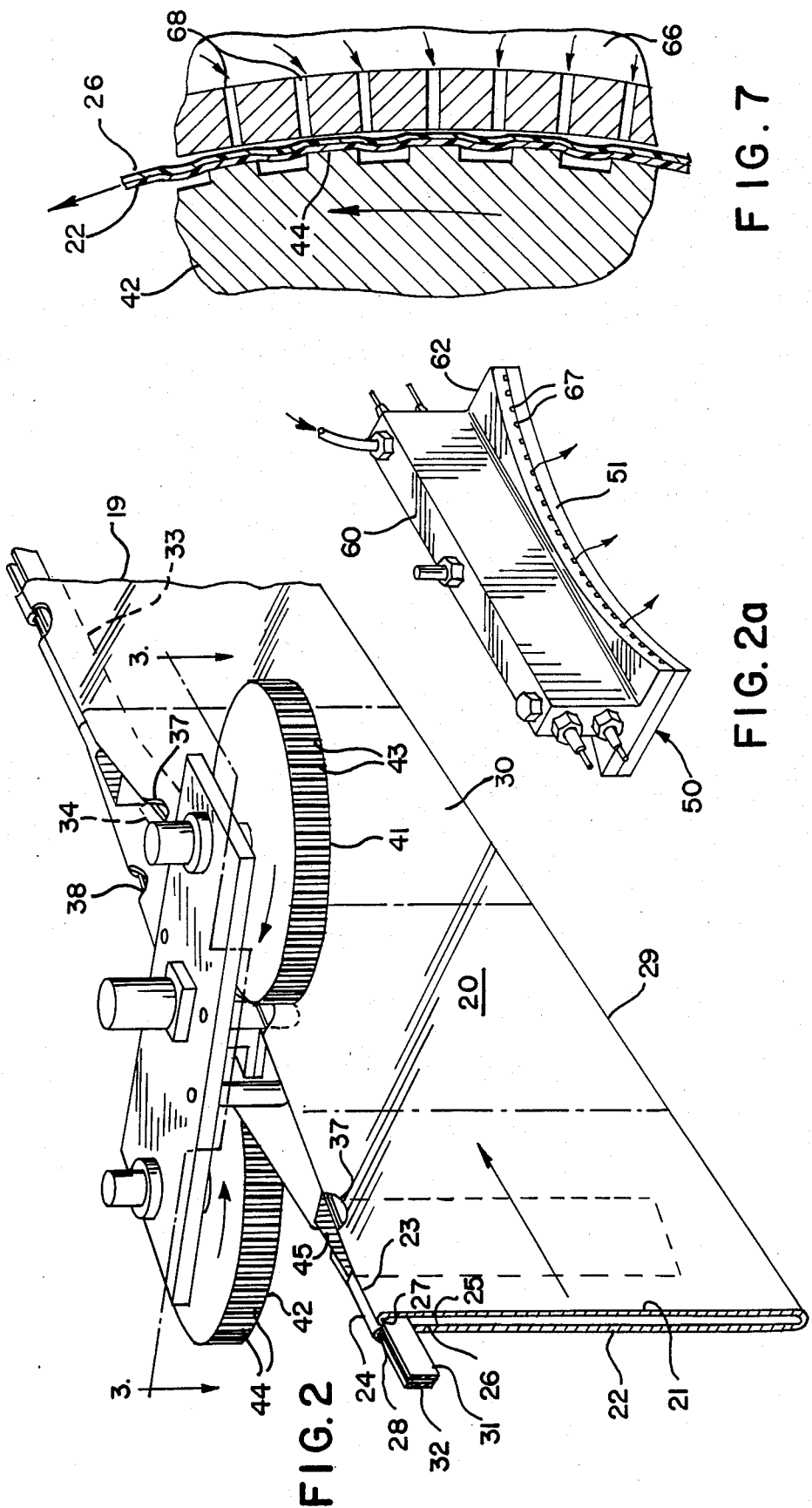

HEM SEAL FOR DRAW TAPE BAGS

BACKGROUND OF THE INVENTION

This invention relates to plastic bags characterized by a draw tape which, when pulled, causes the bag mouth to constrict to a substantially closed condition. Plastic bags of the type described are typically comprised of a bag body folded at the bottom to form front and rear sheets which are ordinarily sealed at the side edges. The upper edges of the front and rear sheets, located opposite the bottom fold, define the mouth of the bag. An upper margin at the bag mouth is typically folded inside the bag to form a hem which is ordinarily sealed to the bag body to form a channel for accommodating the draw tape. Pulling accessible portions of the draw tape typically causes the bag mouth to constrict and close as previously described.

Draw tape bags of the type described are often manufactured by automatic bag making machinery at a relatively rapid rate. This is typically accomplished by passing a web of plastic material through a number of folding, sealing and operating stations. As such, the aforementioned hem is typically made and sealed automatically by machine at a so-called hem sealing station. In many such bag making operations this hem is intermittently sealed to the bag body; that is, the hem is attached to the bag body at spaced intervals, rather than attached to the bag body along its entire girth. Heretofore, such an intermittent hem seal has been ordinarily accomplished by briefly stopping the movement of the web so that a press can be brought into position to heat seal the hem to the bag body at spaced intervals.

Though the intermittent hem seal provided by such an operation has been acceptable, the time required to stop the movement of the web while the press is moved into position to make the seal, however brief it may be, is undesirable. Indeed, almost any stoppage of the web as it proceeds through the manufacturing process may have concomitant drawbacks in efficiency, speed and economy.

Accordingly, it is a primary object of this invention to enable hem seals to be continuously made during the manufacture of draw tape bags. It is another object of this invention to provide an apparatus and method in the manufacture of draw tape bags which enables the creation of an intermittent hem seal without stopping the manufacturing process. Other objects of the invention, along with many features and advantages, will become apparent upon reading the detailed description in conjunction with the accompanying drawings.

SUMMARY OF THE INVENTION

The objects, features and advantages of invention are achieved by providing an apparatus, used in the manufacture of draw tape plastic bags having a hem defining a channel for the draw tape, which includes means for continuously forming a seal securing the hem to the body of the bag. The apparatus comprises conveyor means for continuously moving a web of plastic material, and urging means, disposed along the conveyor, adapted to cause portions of the hem to be moved into contact with the web as the web is continuously moved by the conveyor. The apparatus further comprises heat application means, adjacent the urging means, adapted to apply sufficient heat to the web so that portions of the hem adhere to the web, whereby a hem seal is formed without stopping the movement of the web.

In the manufacture of draw tape plastic bags of the type described, the invention further contemplates a method for continuously forming a seal, such as an intermittent seal, securing the hem to the body of the bag comprising the steps of conveying a web of plastic material, from which the bag body will be formed, to a hem sealing station, continuously moving the web through the hem sealing station so that intermittent portions of the hem are brought into contact with the web, and causing sufficient heat to be applied to the web so that the intermittent portions of the hem adhere to the web without stopping the movement of the web through the hem sealing station.

DETAILED DESCRIPTION OF THE DRAWINGS

A preferred embodiment of the invention, summarized above, along with various other aspects and features relating thereto, is illustrated in the accompanying drawings in which:

FIG. 1 is a block diagram identifying the various steps that are typically involved in the high speed, automatic manufacture of draw tape bags of the type that are made by the apparatus and methods of this invention;

FIG. 2 is a perspective view of a web of plastic material as it passes through the hem sealing station represented in block form in FIG. 1, with some, but not all, of the apparatus and machinery utilized at the hem sealing station also shown in perspective;

FIG. 2a is a perspective view of a portion of the apparatus also utilized at the hem sealing station represented in block form in FIG. 1;

FIG. 7 is an enlarged, schematic view of a portion of the apparatus taken along lines 7—7 in FIG. 6.

DETAILED DESCRIPTION OF AN EXEMPLARY EMBODIMENT OF THE INVENTION

Figure 3:
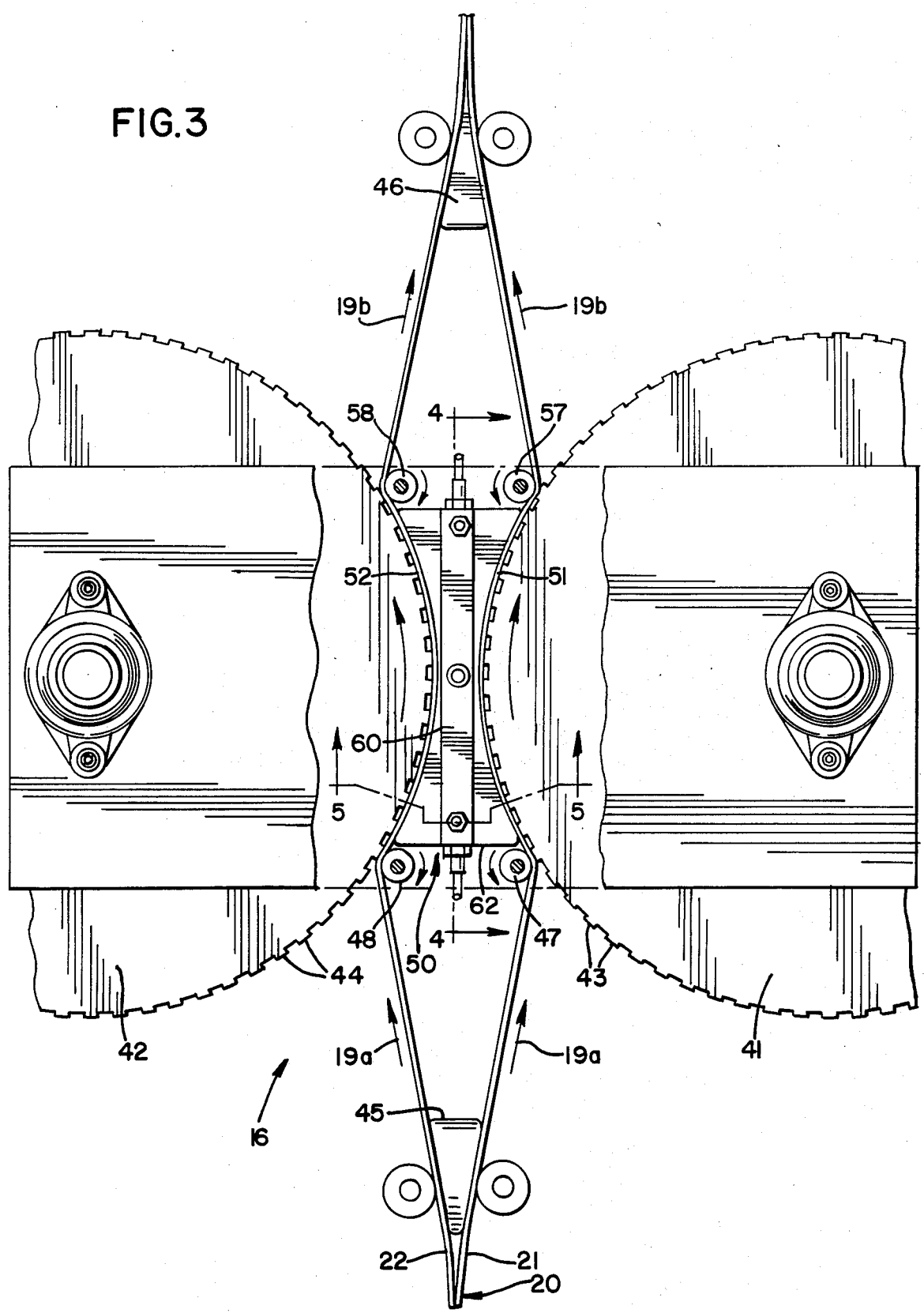
FIG. 3 is an enlarged, schematic view of the portion of the apparatus shown in FIG. 2 known as a hot air sealer, taken along lines 3—3 in FIG. 2.

Referring now to FIG. 1, machinery for the automatic, high-speed manufacture of draw tape bags is represented in block form by the reference numeral 10. More particularly, such machinery typically includes an unwinding station 12 which may comprise a plurality of rollers for unwinding and conveying a web of plastic material in C-folded condition. As used herein, the term C-folded condition refers to a length of material which has been folded over onto itself so as to form what may be subsequently identified as a front sheet and a rear sheet which are joined by the fold at the bottom, and are unjoined at the top so as to approximate the letter "C" in cross-section. The source of the web may be a master roll of C-folded film, an extruder continuously producing blown film which is shaped into the desired form, etc.

The C-folded web is typically passed to a dancer station 13, which may comprise a series of rollers to compensate for the variations in speed that may occur as the web is moved through other stations comprising the machinery 10. The web may then be passed to a tape application station 14 containing a spool of plastic material which is to be used as the draw tape for constricting the opening of the completed bags in the manner previously explained. The material comprising the draw tape is aligned with one or both unjoined top edges of the C-folded web, and conveyed adjacent thereto at substantially the same rate of speed.

The C-folded web and the adjacent draw tape material are typically conveyed to a hem forming station 15. At the hem forming station, the top edges of the C-folded web may be folded toward the existing bottom fold in the C-folded web, preferably interiorly of what would ultimately be a completed bag, to form a hem at the bag mouth. At the hem forming station 15, the hem may also be punched at predetermined spaced intervals to provide access to the draw tape after the hem is subsequently sealed around the draw tape.

After the hem is formed, it may then be conveyed to a hem sealing station 16 where the hem is sealed to the web, thereby defining a channel with the draw tape slidably enclosed therein. The apparatus and methods for sealing the hem to the web at hem sealing station 16 will be described in greater detail hereinafter.

Upon leaving the hem sealing station 16, the web may be conveyed to another dancer station 17 which performs a similar function as dancer station 13. From dancer station 17 the web is typically passed to a bag forming station 18. At bag forming station 18, the web is cut into bag-sized widths, and the sides of the C-folded web, including the ends of the hem defining the channel enclosing the draw tape, are sealed to form the side seams of a completed bag. The completed bags may then be folded and sorted for packaging at bag forming station 18, or at other stations not specifically represented in FIG. 1.

Referring now to FIG. 2, there is shown a portion of the web, identified by reference numeral 20, as it enters the hem sealing station 16 referred to in FIG. 1. The web 20 moves through the hem sealing station 16 in the direction of the arrow, with the leading edge of web 20 being identified by reference numeral 19.

Web 20 comprises a continuous length of C-folded plastic material folded upon itself at a bottom fold 29 to define a front sheet 21 and a rear sheet 22. Portions of the front and rear sheets 21, 22 of web 20 form a bag body 30 which, after web 20 passes through the machinery referred to in FIG. 1, will comprise a draw tape bag of the type previously described. Portions of the front sheet 21 and the rear sheet 22 of web 20 also form hems identified, respectively, by reference numerals 25 and 26. Hem 25 is formed by an inward fold 23 at what will become the bag mouth, whereby hem 25 extends interiorly of bag body 30. Similarly, hem 26 is formed by an inward fold 24, whereby hem 26 also extends interiorly of bag body 30.

Hem 25 may be secured to the bag body 30 by an intermittent hem seal 33, and hem 26 may be likewise secured to bag body 30 by an intermittent hem seal 34. When hem seals 33 and 34 are made, whether they be intermittent or non-intermittent, hems 25 and 26 define, respectively, channels 27 and 28 at the mouth of the bag body 30. Channel 27 encloses a length of draw tape 31, and channel 28 encloses a length of draw tape 32. In order to provide access to draw tapes 31, 32 enclosed within channels 27, 28, a cut-out 37 is provided in hem 25 for each bag made from web 20. A similar cut-out 38 is provided in hem 26. Thus, when each draw tape bag is completed, the portions of draw tapes 31 and 32 accessible from cut-outs 37 and 38 can be grabbed between the thumb and forefinger, and pulled to constrict the opening of the bag mouth.

Referring now to FIG. 3, the web 20 is shown immediately afer entering the hem sealing station 16 at the arrows 19a, and immediately prior to exiting the hem sealing station at the arrows 19b. A pre-sealing web guide 45 separates the front and rear sheets 21, 22 and passes them to rollers 47, 48, respectively. As such, front sheet 21 is passed between roller 47 and a front sheet seal wheel 41. Similarly, rear sheet 22 is passed between roller 48 and a rear sheet seal wheel 42. Front sheet seal wheel 41 has, at its periphery, a plurality of spaced ridges 43, the tops of which are preferably coated with an anti-stick material such as Teflon. Rear sheet seal wheel 42 preferably has similar ridges 44, shown more clearly in FIG. 7.

The spaced ridges 43 and 44 associated with seal wheels 41 and 42, respectively, serve to form intermittent hem seals at the mouth of the bag body 30 in a manner described in greater detail hereinafter. If a non-intermittent hem seal is desired, however, seal wheels 41 and 42 can be fabricated without spaced ridges 43 and 44.

Figure 5:
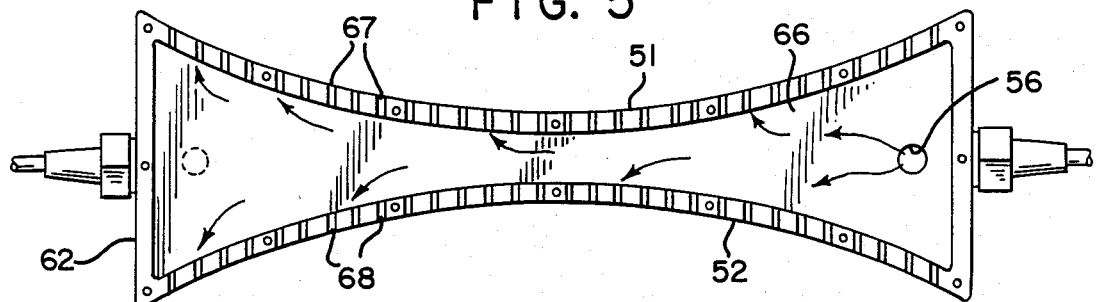
FIG. 5 is an enlarged, schematic view of a portion of the hot air sealer taken along lines 5—5 in FIG. 3.

As web 20 moves through hem sealing station 16, the front sheet 21 is guided between the periphery of front sheet seal wheel 41 and a front contoured surface 51 of a hot air sealer 50. In the same manner, rear sheet 22 is guided between the periphery of rear sheet seal wheel 42 and a rear contoured surface 52 of hot air sealer 50. Front contoured surface 51 and rear contoured surface 52 of hot air sealer 50 are more clearly shown in FIG. 5.

As front sheet 21 moves between the front sheet seal wheel 41 and the front contoured surface 51 of hot air sealer 50, hot air emanates therefrom causing portions of web 20 to begin to melt. In accordance with one embodiment of the invention, intermittent portions of the hem 25 may then move into contact with the bag body 30 by ridges 43 of seal wheel 41 causing spaced portions of the hem 25 to adhere to the web 20, thereby effecting the formation of intermittent seal 33 shown in FIG. 2. At the same time, and in the same manner, hot air sealer 50 causes spaced portions of the hem 26 to adhere the web 20, thus effecting the formation of intermittent hem seal 34.

After hem seals 33 and 34 have been made, the front sheet 21 is moved past a roller 57 and the rear sheet 22 is moved past a roller 58. Roller 57 facilitates the movement of front sheet 21 to a postsealing web guide 46, where it is again brought into contact with rear sheet 22, which has been moved to post-sealing guide 46 in the same manner. The web 20 then exits the hem sealing station 16. Significantly, the seals 33 and 34, whether they be intermittent or non-intermittent, have been made without stopping the movement of web 20 through hem sealing station 16.

Referring now to FIGS. 2a and 4–6, the hot air sealer 50 is shown in greater detail. In particular, hot air sealer 50 is shown to comprise a heater block 60 and a manifold 62 mounted thereto. Heater block 60 is, in this embodiment, of rectangular cross-section having an interior passageway which serves as a heating chamber 54 shown most clearly in FIG. 4. Disposed within heating chamber 54 are conventional electrically operated heating elements 55. Communicating with heating chamber 54 is an air inlet 53, coupled to an air supply (not shown). Air is passed into heating chamber 54 via air inlet 53, and heated to a temperature sufficient to melt the plastic material comprising web 20 when it is applied thereto.

Figure 4:
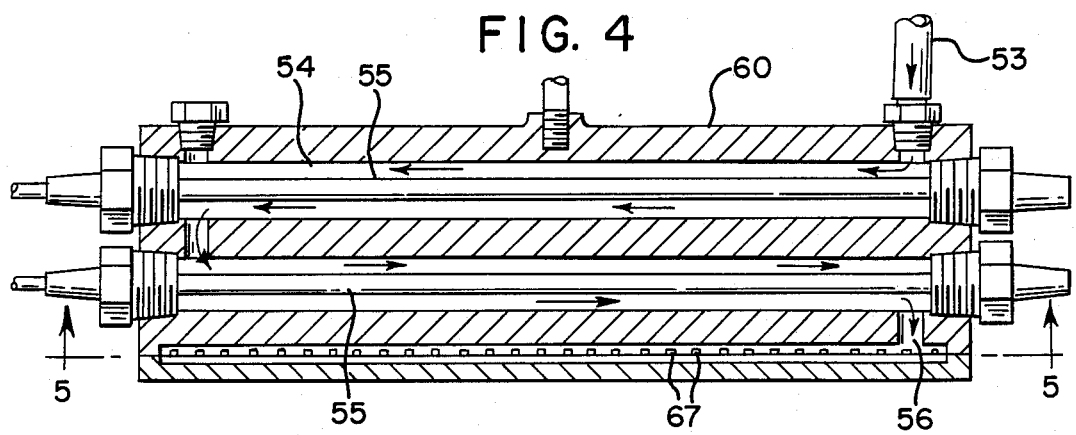
FIG. 4 is an enlarged, schematic view of the hot air sealer taken along lines 4—4 in FIG. 3.
Figure 6:
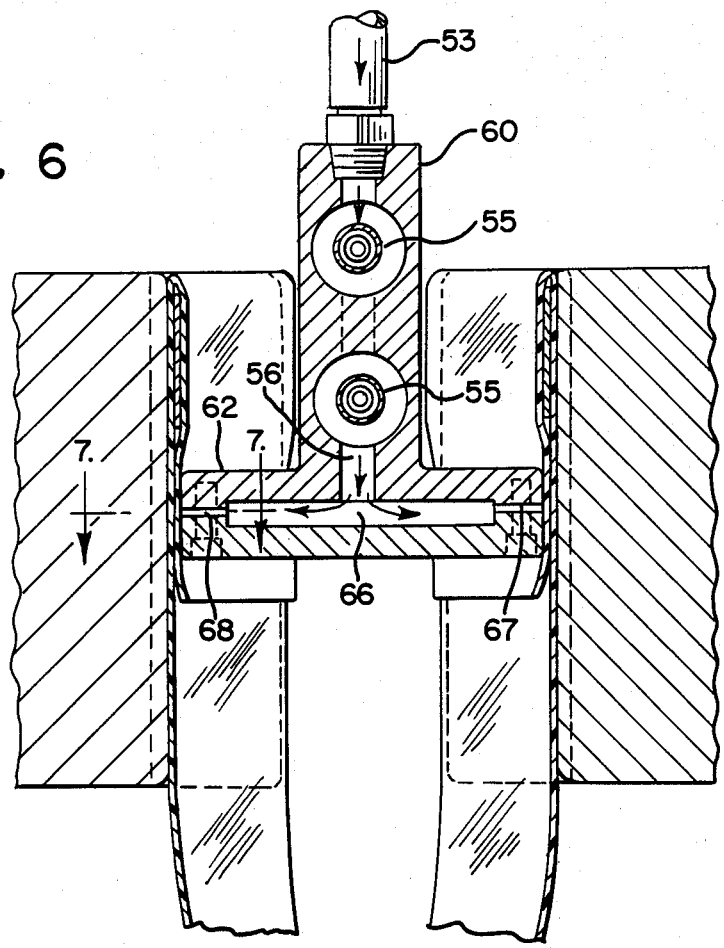
FIG. 6 is an enlarged, schematic view of a portion of the apparatus shown in FIG. 3.

Defined within heating chamber 54 of heater block 60 is a hot air port 56, shown best in FIGS. 4 and 6. Hot air port 56 communicates with manifold 62, whereby hot air heated by heating elements 55 is passed from heating chamber 54 to manifold 62. As shown best in FIG. 6, manifold 62 comprises a hot air channel 66 communicating with hot air port 56 of heater block 60. Hot air channel 66 extends substantially across the length of manifold 62 and, as shown in FIGS. 2a and 7, communicates with a plurality of hot air outlets 67 located at surface 51 of manifold 62, and also communicates with another plurality of hot air outlets 68 located at surface 52 of manifold 62. Manifold 62 thus distributes the hot air heated by heating elements 55 in heating chamber 54 at spaced intervals along the surfaces 51, 52 via hot air outlets 67, 68, respectively.

The operation of the hem sealing station 16 can now be explained in greater detail. In particular, as the C-folded web 20 advances into the web hem sealing station, the front sheet 21 and rear sheet 22 are separated by the pre-sealing web guide 45. The front sheet 21 is guided by roller 47 between the front contoured surface 51 of hot air sealer 50 and the periphery of seal wheel 41. Similarly, roller 48 guides the rear sheet 22 between the rear contoured surface 52 of hot air sealer 50 and the periphery of seal wheel 42.

As the front and rear sheets 21, 22 are guided into the position described above, air is being passed into the heating chamber 54 of heater block 60 via air inlet 53. The air is then heated by heater elements 55 and passed as hot air to manifold 62 via hot air port 56. Manifold 62 distributes the hot air through hot air channel 66, whereby the hot air is passed from manifold 62 at spaced intervals via hot air outlets 67, 68 in the front and rear contoured surfaces 51 and 52, respectively, of manifold 60.

The hot air emanating from hot air outlets 67, 68 is applied, respectively, to the hems 25, 26 of front and rear sheets 21, 22 of web 20 at the spaced intervals defined by the separations between the individual hot air outlets 67, 68. As such, portions of hems 25, 26 are melted along lengths of sheets 21, 22 to which the hems 25, 26 are to be respectively sealed. Simultaneously, lengths of front sheet 21 are urged into intermittent contact with hem 25 by the ridges 43 associated with seal wheel 41. Intermittent portions of front sheet 21 are thus brought into contact with those portions of the hem 25 that have been melted by the hot air emanating from the hot air outlets 67, thereby forming the intermittent hem seal 33. Intermittent hem seal 34 in hem 26 of rear sheet 22 is, of course, formed in the same manner.

It should be understood that, if non-intermittent hem seals are desired, seal wheels 41 and 42 are fabricated without ridges 43 and 44, respectively. In such a situation, the front sheet 21 is urged into pressure contact with the hem 25 by seal wheel 41, thus forming an uninterrupted hem seal substantially the entire way across the mouth of bag body 30. Hem 26 can, of course, be formed in the same manner.

After the hem seals 33, 34 have been formed, the front and rear sheets 21, 22 are guided by rollers 57 and 58 toward the post-sealing web guide 46. By that time, the plastic melted by the hot air passed from hot air outlets 67 has begun to cool, thereby making the hem seals 33 and 34 substantially permanent.

Web 20 is then returned to its C-folded condition at guide 46, and passed on to the next station in the draw tape bag manufacturing process. It will, of course, be understood that the web 20 did not stop as it moved through the hem sealing station, and that intermittent hem seals 33 and 34 were formed in web 20 continuously and without stopping the movement of the web 20. The same is true if non-intermittent hem seals are formed.

What has been described is a novel apparatus and methodology for manufacturing draw tape bags having a hem seal. Though the apparatus and methods disclosed herein are preferred, other embodiments and modifications which do not part from the spirit and scope of the invention may become apparent to those skilled in the art. All such embodiments and modifications are intended to be covered by the appended claims.

I claim:

1. Apparatus used in the manufacture of draw tape plastic bags formed from a web of plastic material having a hem defining a channel for the draw tape comprising:
   conveyor means for continuously moving said web, having a front sheet and a rear sheet, in C-folded condition;
   first and second seal wheels disposed along said conveyor on opposite sides of said web;
   heat application means, disposed along said first and second seal wheels between said front sheet and said rear sheet, having a first contoured surface facing said first seal wheel and a second contoured surface facing said second seal wheel; said heat application means defining a first plurality of outlets for directing hot air from said first contoured surface toward said first seal wheel and a second plurality of outlets for directing hot air from said second contoured surface toward said second seal wheel; and
   guide means, disposed adjacent said web, for guiding a first hem portion between said first seal wheel and said first contoured surface, and for guiding a second hem portion between said second seal wheel and said second contoured surface, said first seal wheel urging said front sheet into contact with said first hem portion, and said second seal wheel urging said rear sheet into contact with said second hem portion.

2. The apparatus defined in claim 1 wherein said first and second seal wheels include a plurality of ridges disposed about their periphery.

3. The apparatus defined in claim 2 wherein said ridges are substantially equally spaced.

4. The apparatus defined in claim 3 wherein the to surface of said ridges is coated with an anti-sticking material.

5. The apparatus defined in claim 1 wherein said guide means comprises a roller.

6. The apparatus defined in claim 1 wherein said heat application means comprises a heater block having an inlet for receiving air, a chamber communicating with said inlet, and a heating element for heating the air in said chamber.

7. The apparatus defined in claim 6 wherein said heat application means further comprises a manifold having a channel communicating with said chamber, and a plurality of outlets communicating with said channel, whereby said heated air is passed from said chamber to said outlets via said channel.

* * * * *

UNITED STATES PATENT AND TRADEMARK OFFICE
CERTIFICATE OF CORRECTION

PATENT NO. : 4,881,931
DATED : November 21, 1989
INVENTOR(S) : James E. Buchman

It is certified that error appears in the above-identified patent and that said Letters Patent is hereby corrected as shown below:

On the title sheet, in the first column, under the heading "U.S. PATENT DOCUMENTS," please delete "2,029,853" and substitute therefor --3,029,853--.

On the cover sheet, in the second column, under the heading "U.S. PATENT DOCUMENTS," please delete "3,803,490" and substitute therefor --3,803,990--.

IN THE CLAIMS

In claim 4, column 6, line 53, please delete "to" and substitute therefor --top--.

Signed and Sealed this

Ninth Day of June, 1992

*Attest:*

DOUGLAS B. COMER

*Attesting Officer*          Acting Commissioner of Patents and Trademarks